(12) United States Patent
Lettmann et al.

(10) Patent No.: US 7,812,088 B2
(45) Date of Patent: Oct. 12, 2010

(54) AQUEOUS MULTI-CONSTITUENT COATING MATERIAL, METHOD FOR THE PRODUCTION THEREOF AND USE OF THE SAME

(75) Inventors: Bernhard Lettmann, Drensteinfurt (DE); Andreas Jansen, Münster (DE); Christella Pudelski, Ascheberg (DE)

(73) Assignee: BASF Coatings GmbH, Muenster (DE)

( * ) Notice: Subject to any disclaimer, the term of this patent is extended or adjusted under 35 U.S.C. 154(b) by 1500 days.

(21) Appl. No.: 10/250,639

(22) PCT Filed: Feb. 13, 2002

(86) PCT No.: PCT/EP02/01459

§ 371 (c)(1),
(2), (4) Date: Jul. 3, 2003

(87) PCT Pub. No.: WO02/064659

PCT Pub. Date: Aug. 22, 2002

(65) Prior Publication Data

US 2004/0063846 A1 Apr. 1, 2004

(30) Foreign Application Priority Data

Feb. 13, 2001 (DE) ................... 101 06 574

(51) Int. Cl.
*C08G 18/42* (2006.01)
*C08G 18/66* (2006.01)
*C08G 18/12* (2006.01)

(52) U.S. Cl. .................... 524/591; 524/832; 524/833; 524/845; 524/555; 524/507; 524/839; 524/840; 525/55; 525/450; 525/451; 525/452; 525/453; 525/123; 525/127; 525/128; 525/455; 525/309; 525/302

(58) Field of Classification Search ............. 524/591, 524/501, 507, 839, 840, 832, 833; 525/55, 525/309, 302

See application file for complete search history.

(56) References Cited

U.S. PATENT DOCUMENTS

| 5,266,645 A | * | 11/1993 | Siol et al. ............... 525/309 |
| 6,309,707 B1 | | 10/2001 | Mayer et al. ............ 427/386 |
| 6,395,827 B1 | * | 5/2002 | Pears et al. ............. 525/55 |
| 6,534,588 B1 | * | 3/2003 | Locken et al. .......... 524/591 |
| 2003/0191236 A1 | * | 10/2003 | Buckmann et al. ..... 524/591 |
| 2004/0030031 A1 | * | 2/2004 | Martin et al. ........... 524/502 |

FOREIGN PATENT DOCUMENTS

| CA | 2235077 | | 10/1996 |
| DE | 197 36 535 | | 1/1999 |
| EP | 1 022 618 | | 1/2000 |
| WO | WO 96/10595 | * | 4/1996 |
| WO | WO 96-10595 | * | 4/1996 |
| WO | WO-9610595 A | * | 4/1996 |

OTHER PUBLICATIONS

English Translation for BASF Corporation, et al., U.S. Appl. No. 09/486,103, filed Feb. 21, 2000.
English Translation for BASF Corporation, et al., U.S. Appl. No. 09/856,949, filed May 29, 2001.
English Translation for BASF Corporation, et al., U.S. Appl. No. 09/889,647, filed Nov. 7, 2001.

* cited by examiner

*Primary Examiner*—Duane Smith
*Assistant Examiner*—Ives Wu
(74) *Attorney, Agent, or Firm*—Harness, Dickey & Pierce, P.L.C.

(57) ABSTRACT

An aqueous multicomponent coating material comprising
(I) an aqueous component preparable by mixing at least the following starting products:
(A) at least one secondary aqueous dispersion of at least one (meth)acrylate copolymer containing on average per molecule at least one isocyanate-reactive functional group,
(B) at least one primary aqueous dispersion of at least one (meth)acrylate copolymer containing no isocyanate-reactive functional group, and
(C) at least one pigment and/or one filler;
and also
(II) a component comprising at least one polyisocyanate as crosslinking agent,
and also a process for preparing it, and its use.

11 Claims, No Drawings

AQUEOUS MULTI-CONSTITUENT COATING MATERIAL, METHOD FOR THE PRODUCTION THEREOF AND USE OF THE SAME

CROSS REFERENCE TO RELATED APPLICATIONS

This application is a National Phase Application of patent application PCT/EP02/01459 filed on 13 Feb. 2002, which claims priority to DE 101 06 574.4, filed on 13 Feb. 2001.

The present invention relates to a novel aqueous multicomponent coating material. The present invention also relates to a novel process for preparing aqueous multicomponent coating materials. The present invention further relates to the use of the novel aqueous multicomponent coating materials.

Aqueous multicomponent coating materials comprising at least (I) an aqueous component comprising
   (A1) at least one secondary aqueous dispersion of at least one (meth)acrylate copolymer containing on average per molecule at least one isocyanate-reactive functional group, and if desired
   (A2) at least one further water-dilutable binder which is compatible with the other constituents of component-(I), such as acrylated polyurethane resins and/or polyester acrylates, for example;

and also (II) a component comprising at least one polyisocyanate as crosslinking agent are known from the European patents EP 0 766 717 B 1 and EP 0 856 019 B 1 or from the German patent applications DE 198 55 146 A 1, DE 198 55 167 A 1, and DE 199 04 317 A 1. The (meth)acrylate copolymer (A1) may be prepared by multistage, especially two-stage, copolymerization. Component (I) of these known aqueous multicomponent coating materials may comprise pigments and/or fillers. They may be used as primer-surfacers or topcoat material. Primarily, however, they are used as clearcoat materials for producing clearcoats as part of multicoat color and/or effect coating systems. In this case, the clearcoat materials have numerous advantageous properties, such as a low VOC (volatile organic compounds) content and also very good homogeneity, stability, handling, and spray reliability. The clearcoats produced from them also have an outstanding profile of properties as regards fullness, gloss, leveling, weathering stability, and gasoline resistance. The popping limit of these known clearcoat materials is 58 $\mu$m (DE 198 55 146 A 1) or 60 $\mu$m (DE 198 55 167 A 1 or DE 199 04 317 A 1). This popping limit is generally entirely adequate for clearcoats; for the production of popping-free primer-surfacer coats, however, it is too low.

It is an object of the present invention to provide a novel aqueous multicomponent coating material which continues to have the advantages of the known aqueous. multicomponent coating materials but which has a markedly higher popping limit, so that it is also suitable as a primer-surfacer, especially as a dry sanding primer-surfacer, for producing popping-free primer-surfacer coats with a high dry-film thickness.

The invention accordingly provides the novel aqueous multicomponent coating material comprising (I) an aqueous component preparable by mixing at least the following starting products:
   (A) at least one secondary aqueous dispersion of at least one (meth)acrylate copolymer containing on average per molecule at least one isocyanate-reactive functional group,
   (B) at least one primary aqueous dispersion of at least one (meth)acrylate copolymer containing no isocyanate-reactive functional group, and
   (C) at least one pigment and/or one filler;

and also (II) a component comprising at least one polyisocyanate as crosslinking agent.

In the light of the prior art it was surprising and unforeseeable for the skilled worker that the popping limit of the known aqueous multicomponent coating materials could be significantly increased by adding at least one primary aqueous dispersion of a (meth)acrylate copolymer containing no isocyanate reactive functional groups, so that the novel aqueous multicomponent coating material was outstandingly suitable for the production of popping-free primer-surfacer coats of high dry-film thickness. A particular surprise was the finding that the popping limit was situated even above 100 $\mu$m. At the same time, the other advantageous properties of the known aqueous multicomponent coating materials and of the coatings produced from them were retained in their entirety. On this basis, the novel aqueous multicomponent coating materials exhibited a surprising breadth of application and were suitable for use in particular in automotive OEM finishing and automotive refinish, for the coating of buildings inside and outside, for the coating of doors, windows, and furniture, for industrial coating, including coil coating, container coating, and the impregnation and/or coating of electrical components, and also for coating white goods, including domestic appliances, boilers, and radiators.

The aqueous component (I) for use in accordance with the invention may be prepared by any of a very wide variety of processes which are customary and known in the present field. In accordance with the invention it is of advantage if they are prepared by mixing the starting products (A), (B), and (C) described in detail below and also, if desired, further starting products (D).

The starting product (A) comprises the secondary aqueous dispersion of a (meth)acrylate copolymer (A).

This polymer contains on average per molecule at least one, in particular at least two, isocyanate-reactive functional group(s).

Examples of suitable isocyanate-reactive groups are hydroxyl groups, thiol groups, primary and secondary amino groups, and imino groups, of which the hydroxyl groups are particularly advantageous and are therefore used with preference. In the (meth)acrylate copolymers the hydroxyl groups are preferably present in an amount such as to give a hydroxyl number of from 30 to 250 mg KOH/g.

The (meth)acrylate copolymers (A) are soluble or dispersible in water. The solubility or dispersibility in water is brought about by means of a corresponding level of functional groups which render them water-dispersible and/or water-soluble. These functional groups are functional groups which can be converted into cations by neutralizing agents and/or quaternizing agents, or functional groups which can be converted into anions by neutralizing agents, and/or anionic groups, and/or nonionic hydrophilic groups, especially poly-(alkylene ether) groups.

Examples of suitable functional groups which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium or tertiary sulfonium groups, but especially tertiary sulfonium groups.

Examples of suitable functional groups which can be converted into anions by neutralizing agents are carboxylic acid, sulfonic acid or phosphonic acid groups, especially carboxylic acid groups.

Examples of suitable anionic groups are carboxylate, sulfonate or phosphonate groups, especially carboxylate groups.

Examples of suitable neutralizing agents for functional groups which can be converted into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups which can be converted into anions are ammonia, amines or amino alcohols, such as trimethylamine, triethylamine, tributylamine, dibutylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine, for example. As neutralizing agents it is preferred to use dimethylethanolamine, dibutylamine and/or triethylamine.

In the (meth)acrylate copolymers (A) the amount of the functional groups which render them water-dispersible and/or water-soluble is preferably from 2 to 250 meq/100 g (meth)acrylate copolymer (A). The degree of neutralization is preferably from 40 to 150%.

The water-solubility or water-dispersibility is preferably brought about by means of an appropriate level of carboxylic acid groups and/or carboxylate groups. This level is preferably from 5 to 150 mg KOH/g.

The number-average molecular weight Mn of the (meth)acrylate copolymers (A) may vary widely. It is preferred to use (meth)acrylate copolymers (A) whose number-average molecular weight Mn is not too high, since otherwise the viscosity of the aqueous component (I) in question becomes too high. If the mixing of components (I) and (II) is to take place by hand, which is frequently the case in the field of automotive refinish, it is advisable to adjust the (meth)acrylate copolymers (A) such that their 50% strength solutions in ethoxyethyl propionate at 23° C. have a viscosity ≦10 dPas. Where mechanical mixing is intended, it is possible to use (meth)acrylate copolymers (A) of higher viscosity, whose 50% strength solutions in ethoxyethyl propionate at 23° C. have a viscosity ≦100 dPas. The viscosity is limited at the top end merely by the performance of the mixing equipment. Particular preference is given to (meth)acrylate copolymers (A) having a number-average molecular weight Mn of between 1 000 and 30 000 daltons.

Use is made in particular of (meth)acrylate copolymers (A) obtainable by copolymerization in an organic solvent or solvent mixture and in the presence of at least one polymerization initiator of (a1) a (meth)acrylic ester which is different from but copolymerizable with (a2), (a3), (a4), (a5), and (a6) and is substantially free from acid groups, or a mixture of such monomers, (a2) an ethylenically unsaturated monomer which is copolymerizable with (a1), (a3), (a4), (a5), and (a6) but different from (a5), carries at least one hydroxyl group per molecule, and is substantially free from acid groups, or a mixture of such monomers, (a3) an ethylenically unsaturated monomer which is copolymerizable with (a1), (a2), (a4), (a5), and (a6) and carries per molecule at least one acid group which can be converted into the corresponding acid anion groups, or a mixture of such monomers, and (a4) if desired, one or more vinyl esters of alpha-branched monocarboxylic acids having 5 to 18 carbon atoms per molecule, and/or (a5) if desired, at least one reaction product of acrylic acid and/or methacrylic acid with the glycidyl ester of an alpha-branched monocarboxylic acid having 5 to 18 carbon atoms per molecule or, instead of the reaction product, an equivalent amount of acrylic and/or methacrylic acid which is then reacted, during or after the polymerization reaction, with the glycidyl ester of an alpha-branched monocarboxylic acid having 5 to 18 carbon atoms per molecule, (a6) if desired, an ethylenically unsaturated monomer which is copolymerizable with (a1), (a2), (a3), (a4), and (a5) but different from (a1), (a2), (a4), and (a5), and is substantially free from acid groups, or a mixture of such monomers, the nature and amount of (a1), (a2), (a3), (a4), (a5), and (a6) being selected such that the (meth)acrylate copolymer (A) has the desired OH number, acid number, and molecular weight.

To prepare the polyacrylate resins used in accordance with the invention, the monomer (a1) used may comprise any (meth)acrylic alkyl or cycloalkyl ester having up to 20 carbon atoms in the alkyl radical that is copolymerizable with (a2), (a3), (a4), (a5), and (a6), especially methyl, ethyl, propyl, isopropyl, n-butyl, sec-butyl, tert-butyl, hexyl, ethylhexyl, stearyl, and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic acid oxaalkyl or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth)acrylic acid derivatives. These monomers may include minor amounts of relatively highly functional (meth)acrylic acid alkyl or cycloalkyl esters, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; -trimethylolpropane di- or tri(meth)acrylate; or pentaerythritol di-, tri- or tetra(meth)acrylate. In the context of the present invention, minor amounts of relatively highly functional monomers are those amounts which do not lead to crosslinking or gelling of the polyacrylate resins.

As monomers (a2) it is possible to use ethylenically unsaturated monomers copolymerizable with (a1), (a2), (a3), (a4), (a5), and (a6) but different from (a5) which carry per molecule at least one hydroxyl group and are substantially free from acid groups, such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. With regard to these relatively highly functional monomers (a2), the comments made regarding the relatively highly functional monomers (a1) apply accordingly.

As monomer (a3) it is possible to use any ethylenically unsaturated monomer which carries per molecule at least one acid group, preferably a carboxyl group, and is copolymerizable with (a1), (a2), (a4), (a5), and (a6), or a mixture of such monomers (a3). As component (a3) it is particularly preferred to use acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (a3) Also suitable as component (a3) are the mono(meth)acryloyloxyethyl esters of maleic acid, succinic acid, and phthalic acid.

As monomers (a4), use is made of one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water results in a mixture of carboxylic acids in which the carboxyl groups are located predominantly on a quaternary carbon atom. Examples of other olefinic starting materials are propylene trimer, propylene tetramer, and diisobutylene. Alternatively, the vinyl esters may be prepared from the acids in a manner known per se, for example, by reacting the acid with acetylene. Particular preference—owing to their ready availability—is given to the use of vinyl esters of saturated aliphatic monocarboxylic acids having 9 to 11 carbon atoms with branching on the alpha carbon atom.

As monomer (a5), use is made of the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the tradename "Cardura". The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name "Cardura E10".

As monomers (a6) it is possible to use all ethylenically unsaturated monomers which are copolymerizable with (a1), (a2), (a3), (a4), and (a5S), different from (a1), (a2), (a3), and (a4), and substantially free from acid groups, or mixtures of such monomers. Suitable monomers (a6) include olefins such as ethylene, propylene, but-1-ene, pent-1-ene, hex-1-ene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N-cyclohexyl-N-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers having a number-average molecular weight Mn of from 1 000 to 40 000, preferably from 2 000 to 20 000, with particular preference from 2 500 to 10 000, and in particular from 3 000 to 7 000, and containing on average from 0.5 to 2.5, preferably from 0.5 to 1.5, ethylenically unsaturated double bonds per molecule, as described in DE-A 38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823 or in the international patent application WO 92/22615 on page 12 line 18 to page 18 line 10, or acryloyloxysilane-containing vinyl monomers, preparable by reacting hydroxy-functional silanes with epichlorohydrin and then reacting the reaction product with methacrylic acid and/or hydroxyalkyl esters of (meth)acrylic acid.

It is preferred to use vinylaromatic hydrocarbons.

It is of advantage to use the polysiloxane macromonomers (a6) together with other monomers (a6). In this case the amount of the polysiloxane macromonomer(s) (a6) for modifying the acrylate copolymers (A1) should be less than 5% by weight, preferably from 0.05 to 2.5% by weight, with particular preference from 0.05 to 0.8% by weight, based in each case on the overall weight of the monomers used to prepare the copolymer (A1). The use of polysiloxane macromonomers of this kind leads to an improvement in the slip of the coatings of the invention.

The nature and amount of components (a1) to (a6) are selected such that the (meth)acrylate copolymer (A) has the desired OH number, acid number, and glass transition temperature. (Meth)acrylate copolymers (A) used with particular preference are obtained by copolymerizing (a1) from 20 to 60% by weight, preferably from 30 to 50% by weight, of monomers (a1), (a2) from 10 to 50% by weight, preferably from 15 to 40% by weight, of monomers (a2), (a3) from 1 to 15% by weight., preferably from 1 to 8% by weight, of monomers (a3), (a4) from 0 to 25% by weight, preferably from 5 to 15% by weight, of monomers (a4), (a5) from 0 to 25% by weight, preferably from 5 to 15% by weight, of monomers (a5), and (a6) from 5 to 30% by weight, preferably from 10 to 20% by weight, of monomers (a6), the sum of the weight fractions of the monomers (a1) to (a6) being in each case 100% by weight.

The (meth)acrylate copolymers (A) used in accordance with the invention are prepared in an organic solvent or solvent mixture and in the presence of at least one polymerization initiator. As organic solvents and polymerization initiators, use is made of the solvents and polymerization initiators that are customary for the preparation of (meth)acrylate copolymers and are suitable for preparing aqueous dispersions. The solvents may participate in the reaction with the crosslinking component (II) and thus act as reactive diluents.

Examples of suitable reactive diluents are positionally isomeric diethyloctanediols, oligomeric polyols, or hydroxyl-containing hyperbranched compounds or dendrimers, as described in the patent applications DE 198 09 643 A 1, DE 198 40 605 A 1, and DE 198 05 421 A 1.

Further examples of suitable reactive diluents are polycarbonatediols, polyesterpolyols, poly(meth)acrylatediols or hydroxyl-containing polyaddition products.

Examples of suitable isocyanate-reactive solvents which may be regarded as monofunctional reactive diluents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, isopropoxypropanol or methoxypropyl acetate.

It is also possible first to prepare the (meth)acrylate copolymers (A) in a solvent which is not dilutable with water and following the copolymerization to replace this solvent, in part if desired, by water-dilutable solvents.

Examples of suitable polymerization initiators are initiators which form free radicals, such as organic peroxides, organic azo compounds or C—C-cleaving initiators, for example, such as dialkyl peroxides, peroxocarboxylic acids, peroxodicarbonates, peroxide esters, hydroperoxides, ketone peroxides, azodinitriles or benzpinacol silyl ethers. The initiators are used preferably in an amount of from 1 to 25% by weight, with particular preference from 2 to 10% by weight, based on the overall weight of the monomers (a1) to (a6).

The copolymerization is judiciously conducted at a temperature of from 80 to 200° C., preferably from 110 to 180° C. The preferred solvent used is methyl isobutyl ketone.

The (meth)acrylate copolymer (A) is prepared by multistage copolymerization.

The (meth)acrylate copolymer (A) is preferably prepared by a two-stage process, since in this way the resulting novel aqueous multicomponent coating materials have better processing properties. It is therefore preferred to use (meth) acrylate copolymers (A) obtainable by 1. polymerizing a mixture of (a1), (a2), (a4), (a5), and (a6), or a mixture of portions of the monomers (a1), (a2), (a4), (a5), and (a6), in an organic solvent and/or in one of the above-mentioned reactive diluents, 2. after at least 60% by weight of the mixture consisting of (a1), (a2), (a4), (a5) and, if used, (a6) have been added, adding (a3) and any remainder of the monomers (a1), (a2), (a4), (a5), and (a6), and continuing polymerization, and 3. after the end of the copolymerization, at least partially neutralizing the cation-forming or anion-forming functional groups present in the (meth)acrylate copolymer obtained.

Besides this, however, it is also possible to introduce the monomers (a4) and/or (a5) together with at least one portion of the solvent and to meter the remaining monomers into this initial charge. Furthermore, it is also possible for only part of the monomers (a4) and/or (a5) to be included in the initial charge, together with at least one portion of the solvent, and for the remainder of these monomers to be added as described above. Preferably, for example, at least 20% by weight of the solvent and approximately 10% by weight of component (a4) and (a5), and also, if desired, portions of the monomers (a1) and (a6), are introduced initially.

Preference is further given to preparing the (meth)acrylate copolymers (A) by a two-stage process in which the first stage lasts for from 1 to 8 hours, preferably from 1.5 to 4 hours, and the addition of the mixture of (a3) and any remainder of the monomers (a1), (a2), (a4), (a5), and (a6) is made over the course of from 20 to 120 minutes, preferably over the course of from 30 to 90 minutes. After the end of the addition of. the mixture of (a3) and any remainder of the monomers (a1), (a2), (a4), (a5), and (a6), polymerization is continued until all the monomers used have undergone substantially complete reaction. In this procedure, the second stage may immediately follow the first. Alternatively, the second stage may not be commenced until after a certain time has elapsed, for example, after from 10 minutes to 10 hours.

The amount and rate of admission of the initiator are preferably chosen so as to give a (meth)acrylate copolymer (A) having a number-average molecular weight Mn of from 1 000 to 30 000 daltons. It is preferred to commence the initiator feed a certain time, generally about 15 minutes, before the feed of the monomers. Preference is further given to a process in which the addition of initiator is commenced at the same point in time as the addition of the monomers and ended about half an hour after the addition of the monomers has ended. The initiator is preferably added in a constant amount per unit time. After the end of the initiator addition, the reaction mixture is held at polymerization temperature until (generally 1.5 hours) all of the monomers used have undergone substantially complete reaction. The term "substantially complete reaction" is intended to denote that preferably 100% by weight of the monomers used have been reacted but that it is also possible for a small residual monomer content of not more than about 0.5% by weight, based on the weight of the reaction mixture, to remain unreacted.

Preferably, the monomers for preparing the (meth)acrylate copolymers (A) are polymerized at not too high a polymerization solids, preferably at a polymerization solids of from 80 to 50% by weight, based on the monomers, and subsequently the solvents are removed in part by distillation, so that the resulting (meth)acrylate copolymer solutions (A) have a solids content of preferably from 100 to 60% by weight.

The preparation of the (meth)acrylate copolymers (A) has no special features in terms of its method but instead takes place with the aid of the method of continuous or batchwise copolymerization, under atmospheric or superatmospheric pressure, that are known and customary in the polymers field. Suitable reactors for the copolymerization include the customary and known stirred tanks, stirred-tank cascades, tube reactors, loop reactors or Taylor reactors, as described for example in the patents and patent applications DE 1 071 241 B 1, EP 0 498 583 A 1, and DE 198 28 742 A 1, or in the article by K. Kataoka in Chemical Engineering Science, volume 50, number 9, 1995, pages 1409 to 1416.

For the preparation of secondary aqueous dispersion (A), the (meth)acrylate copolymers (A) following their preparation are dispersed in water or in an aqueous medium containing minor amounts of solid, liquid or gaseous, organic and/or inorganic, low and/or high molecular mass substances in a state of molecularly disperse solution. In the context of the present invention a "minor amount" is an amount which does not destroy the aqueous nature of the aqueous medium. Preferably, deionized water is used.

The solids content of the secondary aqueous dispersion (A) may vary widely. It is preferably from 10 to 80, more preferably from 15 to 75, with particular preference from 20 to 70, with very particular preference from 25 to 65, and in particular from 30 to 55% by weight, based in each case on the dispersion (A).

The starting product (B) comprises a primary aqueous dispersion of at least one (meth)acrylate copolymer (B) containing no isocyanate-reactive functional group.

The (meth)acrylate copolymers (B) are prepared by emulsion polymerization and are therefore obtained directly as primary dispersions. The emulsion polymerization can be carried out using the above-described apparatus and initiators. Also suitable are customary and known free-radical redox initiators. During the emulsion polymerization, furthermore, it is advisable to use the emulsifiers described in the international patent application WO 97/23306 in the 5$^{th}$ paragraph of page 3 and in the paragraph bridging pages 3 and 4.

The glass transition temperature of the (meth)acrylate copolymers (B) is preferably between –10 and 70, more preferably between 0 and 60, with particular preference between 10 and 50, and in particular between 15 and 40° C. Their number-average molecular weight Mn (determined by gel permeation chromatography using polystyrene as standard) is preferably from 100 000 to 3 000 000, more preferably from 150 000 to 2 500 000, with particular preference from 200 000 to 2 000 000, with very particular preference from 250 000 to 1 750 000, and in particular from 300 000 to 1 500 000 daltons.

The (meth)acrylate copolymers (B) are preferably prepared by copolymerizing the above-described monomers (a1), especially (meth)acrylic alkyl esters having 1 to 8 carbon atoms in the alkyl radical, in particular methyl, ethyl, propyl, isopropyl, n-butyl, sec-butyl, tert-butyl, hexyl or ethylhexyl acrylate or methacrylate, especially n-butyl acrylate, monomers (a3), in particular acrylic acid and methacrylic acid, especially acrylic acid, and monomers (a6), in particular vinylaromatic monomers, particularly styrene, alpha-methylstyrene and/or vinyltoluene, especially styrene, and also, if desired, (meth) acrylamide and its above-described derivatives.

The composition of the (meth)acrylate copolymers (B) may vary widely. Based in each case on the (meth)acrylate copolymer (B), they preferably contain from 10 to 80, more preferably from 15 to 75, with particular preference from 20 to 70, with very particular preference from 25 to 65, and in particular from 30 to 60% by weight of copolymerized monomers (a1), from 0.1 to 20, more preferably from 0.2 to 18, with particular preference from 0.3 to 16, with very particular preference from 0.4 to 14, and in particular from 0.5 to 10% by weight of copolymerized monomers (a3), and from 10 to 80, more preferably from 15 to 75, with particular preference from 20 to 70, with very particular preference from 25 to 65, and in particular from 30 to 60% by weight of copolymerized monomers (a6).

The solids content of the primary aqueous dispersion (B) may vary widely. It is preferably from 10 to 80, more preferably from 15 to 75, with particular preference from 25 to 70, with very particular preference from 30 to 65, and in particular from 35 to 60% by weight, based in each case on the dispersion. (B).

The primary aqueous dispersions (B) are commercially customary products and are sold, for example, by the company BASF Aktiengesellschaft under the brand name Acronal®, especially Acronal® 290 D, or by the company Zeneca Resins under the brand name Neocryl®, especially Neocryl® XK-70.

The amount of the (meth)acrylate copolymer (A) in component (I) may vary widely. Based on the solids of component (I), it is preferably from 5 to 50, more preferably from 6 to 45, with particular preference from 7 to 40, with very particular preference from 8 to 35, and in particular from 2 to 30% by weight.

Similarly, the amount of the (meth)acrylate copolymer (B) in component (I) may vary widely. Based on the solids of component (I), it is preferably from 5 to 50, more preferably from 6 to 45, with particular preference from 7 to 40, with very particular preference from 8 to 35, and in particular from 2 to 30% by weight.

For component (I) and for the novel aqueous multicomponent coating material it is of advantage if the weight ratio of (meth)acrylate copolymer (A) to (meth)acrylate copolymer (B) is from 10:1 to 1:3, preferably from 8:1 to 1:2.5, with particular preference from 6:1 to 1:2, with very particular preference from 4:1 to 1:1.5, and in particular from 2:1 to 1:1.

The starting product (C) comprises at least one pigment and/or one filler. The products in question may comprise color and/or effect pigments, fluorescent pigments, electrically conductive and/or magnetically shielding pigments, metal powders, pigments which impart scratch resistance, organic dyes, organic and inorganic, transparent or opaque fillers and/or nanoparticles.

Examples of suitable effect pigments are metal flake pigments such as commercially customary aluminum bronzes, aluminum bronzes chromated in accordance with DE 36 36 183 A 1, and commercially customary stainless steel bronzes, and also nonmetallic effect pigments, such as pearlescent pigments and interference pigments, for example, platelet-shaped effect pigments based on iron oxide with a shade from pink to brownish red, or liquid-crystalline effect pigments. For further details, reference is made to Römpp Lexikon Lacke und Druckfarben, Georg Thieme Verlag, 1998, page 176, "effect pigments" and pages 380 and 381, "metal oxide/mica pigments" to "metal pigments", and to the patent applications and patents DE 36 36 156 A 1, DE-37 18 446 A 1, DE 37 19 804 A 1, DE 39 30 601 A 1, EP 0 068 311 A 1, EP 0 264 843 A 1, EP 0 265 820 A 1, EP 0 283 852 A 1, EP 0 293 746 A 1, EP 0 417 567 A 1, U.S. Pat. Nos. 4,828,826 A and 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigment" page 567, "titanium dioxide pigments", pages 400 and 467, "naturally occurring pigments", page 459, "polycyclic pigments", page 52, "azomethine pigments", "azo pigments", and page 379, "metal complex pigments".

Examples of fluorescent pigments (daylight fluorescent pigments) are bis(azomethine) pigments.

Examples of suitable electrically conductive pigments are titanium dioxide/tin oxide pigments.

Examples of suitable magnetically shielding pigments are pigments based on iron oxides or chromium dioxide.

Examples of suitable metal powders are powders of metals and metal alloys such as aluminum, zinc, copper, bronze or brass.

Suitable soluble organic dyes are lightfast organic dyes with little or no tendency to migrate from the novel aqueous multicomponent coating material or from the coatings produced from it. The migration tendency may be determined by the skilled worker on the basis of his or her general knowledge in the art and/or with the aid of simple preliminary rangefinding experiments, as part of tinting tests, for example.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, reference is made to Römpp Lexikon Lacke und Druckfarben, Georg Thieme Verlag, 1998, pages 250 ff., "fillers".

It is preferred to employ mica and talc if the intention is to enhance the scratch resistance of the coatings produced from the novel aqueous multicomponent coating materials.

It is further of advantage to use mixtures of platelet-shaped inorganic fillers such as talc or mica and nonplatelet-shaped inorganic fillers such as chalk, dolomite, calcium sulfates, or barium sulfate, since by this means it is possible to adjust with great effectiveness the viscosity and the rheology.

Examples of suitable transparent fillers are those based on silicon dioxide, aluminum oxide or zirconium oxide, but especially nanoparticles on this basis.

The amount of the above-described pigments and/or fillers (C) in component (I) may vary very widely and is guided by the requirements of each individual case. Based on the solids of component (I) it is preferably from 10 to 90, more preferably from 15 to 85, with particular preference from 20 to 80, with very particular preference from 25 to 75, and in particular from 30 to 70% by weight.

Moreover, the aqueous component (I) may comprise customary and known amounts of further customary and known additives (D) such as the above-described reactive diluents; other crosslinking agents for the thermal curing, which are different from the polyisocyanates of component (II) (cf. the German patent application DE 198 55 146 A 1, page 15 line 16, page 16 line 2); other binders or binder dispersions, different from the above-described binders or dispersions (A) and (B), such as, for example, primary dispersions of hydroxyl-containing (meth)acrylate copolymers; low-boiling organic solvents and high-boiling organic solvents ("long solvents"); water; UV absorbers; light stabilizers; free-radical scavengers; thermolabile free-radical initiators; thermal crosslinking catalysts; devolatilizers; slip additives; polymerization inhibitors; defoamers; emulsifiers; wetting agents and dispersants; adhesion promoters; leveling agents; film-forming auxiliaries; rheology control additives (thickeners); flame retardants; siccatives; dryers; antiskinning agents; corrosion inhibitors; waxes and flatting agents. Examples of these additives (D) and also further suitable additives (D) are described in the textbook "Lackadditive" [additives for coatings] by Johan Bieleman, Wiley-VCH, Weinheim, New York, 1998.

The preparation of the aqueous component (I) has no special features in terms of its method but instead is carried out by mixing of the above-described starting products (A), (B), and (C), and also (D), if used, using the apparatus customary and known in the coatings field for the mixing of substances, such as dissolvers, including inline dissolvers, Ultraturrax, stirred tanks, kneaders, extruders, stirred mills or microfluidizers.

The starting products (C) may be mixed first of all with the starting product (A) or (B) or may be mixed with the mixture of the starting products (A) and (B). It is of advantage in accordance with the invention if the starting products (C) are first mixed with the starting product (A), after which suitable additives (D) are added if desired to the resulting mixture. The mixture of (A) and (C) and also, if used, (D) may subsequently be ground in a suitable apparatus, an example being a stirred mill, until the desired Hegmann fineness is reached, preferably of from 10 to 30, more preferably from 12 to 28, with particular preference from 14 to 26, with very particular preference from 16 to 24, and in particular from 18 to 20 µm. Subsequently, the ground mixture is mixed with the starting product (B), to which likewise suitable additives (D) may be added beforehand.

Component (II) comprises at least one polyisocyanate as crosslinking agent. Examples of suitable polyisocyanates and components (II) are described in the German patent application DE 199 04 317 A 1, page 13 lines 14 to 51. Component (II) may further comprise at least one of the above-described other crosslinking agents (cf. also DE 199 04 317A, pages 13 line 52 to page 14 line 41).

The preparation of the novel aqueous multicomponent coating material from the components (I) and (II) described above and also, if desired, further components, presents no special features in terms of its method but is instead carried out with the aid of the customary and known, above-described mixing apparatus and mixing techniques or by means of customary two-component or multicomponent metering and mixing units. For the preparation of automotive refinish materials, which are customarily prepared in small amounts, mixing takes place by hand if the viscosity of components (I) and (II) permits. The resulting novel aqueous multicomponent coating material may be mixed with further components (III), etc. Preferably, it is adjusted with deionized water to the desired application viscosity before being applied.

The novel aqueous multicomponent coating materials may be applied by customary application methods, such as spraying, knife coating, brushing, flow coating, dipping or rolling, for example, to any desired substrates, such as metal, wood, plastic, glass, mineral building materials, ceramic or paper, for example. On the basis of their advantageous properties they may be used with advantage no only in automotive OEM finishing and automotive refinish but also to coat buildings inside and outside, to coat doors, windows, and furniture, for industrial coating, including coil coating, container coating, and the impregnation and/or coating of electrical components, and also for coating white goods, including domestic appliances, boilers, and radiators.

The novel aqueous multicomponent coating material is preferably used as a primer-surfacer or topcoat material in automotive OEM finishing and automotive refinish. It displays particular advantages in its use as a dry-sanding primer-surfacer in automotive refinish.

When used in automotive refinish the novel aqueous multicomponent coating materials are cured normally at temperatures of below 120° C., preferably at temperatures of not more than 80° C. When used in automotive OEM finishing, higher curing temperatures are also employed.

In all of these applications the coating materials produce coatings which even at high dry-film thicknesses of more than 100 μm are free from popping marks and other film defects and which exhibit outstanding adhesion to the respective substrates, for example, to the original finishes of automobiles. As dry-sanding primer-surfacer coats they may be sanded without problems and overcoated with all customary and known basecoat and/or clearcoat materials. After their curing, the dry-sanding primer-surfacer coats exhibit outstanding adhesion to the basecoats and/or clearcoats.

EXAMPLES AND COMPARATIVE EXPERIMENTS

Preparation Example 1

The Preparation of a Secondary Aqueous Dispersion (A)

A steel reactor equipped with stirrer, reflux condenser, two feed vessels and oil heating was charged with 94 parts by weight of methyl isobutyl ketone and this initial charge was heated to 110° C. with stirring. Subsequently, over the course of three hours, a monomer mixture of 32.9 parts by weight of styrene, 38.3 parts by weight of methyl methacrylate, 22 parts by weight of lauryl methacrylate, 49.5 parts by weight of hydroxyethyl methacrylate and 43.9 parts by weight of methyl methacrylate was metered in at a uniform rate. Beginning simultaneously and added in parallel with the monomer mixture, a mixture of 25.8 parts by weight of methyl isobutyl ketone and 11.3 parts by weight of tert-butyl peroxyethylhexanoate was metered in at a uniform rate. The resulting reaction mixture was stirred at 110° C. for one hour.

Subsequently, at the same temperature, a monomer mixture of 14.1 parts by weight of styrene, 16.4 parts by weight of methyl methacrylate, 9.4 parts by weight of lauryl methacrylate, 52.4 parts by weight of hydroxyethyl methacrylate, 18.8 parts by weight of butyl methacrylate and 15.9 parts by weight of acrylic acid was metered in over 1.5 hours. Beginning at the same time and in parallel with the monomer mixture, a solution of 16.6 parts by weight of methyl isobutyl ketone and 7.5 parts by weight of tert-butyl peroxyethylhexanoate was metered in over two hours. The resulting reaction mixture was stirred at 110° C. for two hours.

Thereafter, 17.5 parts by weight of dimethylethanolamine were added to the reaction mixture, after which the neutralized reaction mixture was dispersed at 80° C. in 149.5 parts by weight of deionized water. The resulting dispersion was held at 80° C. for one hour. Subsequently a further 330 parts by weight of deionized water were added and the methyl isobutyl ketone was distilled off under reduced pressure.

The resulting secondary aqueous dispersion was adjusted to a solids content of 40% by weight using deionized water. It had a pH of 7.5 and an acid number of 40 mg KOH/g methacrylate copolymer (A).

Example 1

The Preparation of a Novel Aqueous Multicomponent Coating Material 1.1 The Preparation of the Aqueous Component (I)

To prepare the aqueous component (I), 20 parts by weight of the dispersion of preparation example 1 were mixed in a dissolver with the substances listed below in the stated sequence and amount:

0.27 part by weight of deionized water, 0.03 part by weight of dimethylethanolamine, 0.4 part by weight of butyl glycol, 0.4 part by weight of the wetting agent Tensid S from Air Products, 0.3 part by weight of the defoamer Byk® 23 from Byk Chemie, 2.25 parts by weight of deionized water, 2.25 parts by weight of butyl glycol, 0.6 part by weight of Aerosil® R 972 from Degussa, 7.0 parts by weight of talc 10 MO micro from Luzenac, 3.0 parts by weight of Novacite® L 207 A (silicon dioxide from Chemag), 10.2 parts by weight of blanc fixe micro (barium sulfate pigment from Sachtleben), 8.0 parts by weight of aluminum silicate from Lonza (Engelhard), 7.2 parts by weight of titanium rutile TR 92 (titanium dioxide pigment from Tioxide), 0.3 part by weight of lamp black 101 (carbon black pigment from Degussa), and 6.6 parts by weight of deionized water.

The resulting mixture was ground in a stirred mill to a Hegmann fineness of from 18 to 20 μm. Cooling ensured that the temperature of the material being milled did not rise above 50° C.

68.8 parts by weight of the resulting dispersion (A/C/D) were mixed in a dissolver with 0.2 part by weight of ten percent strength aqueous sodium nitrite solution and 16 parts by weight of a hydroxyl-containing primary acrylate dispersion Bayhydrol® VPLS 2318 (solids content: 43% by weight; hydroxyl content: 2.0% by weight) from Bayer AG.

In parallel, 10 parts by weight of the primary acrylate dispersion Neocryl® XK 70 were introduced into a dissolver and mixed with 0.8 part by weight of a 12.5 percent strength solution of Nipacite® BIT 20 in water (preservative based on 1,2-benzisothiazolin-3-one from Nipa Laboratories GmbH), a mixture of 0.65 part by weight of deionized water, 0.37 part by weight of ethoxypropanol, 0.37 part by weight of Solvesso® 200 and 0.06 part by weight of Additol® XW 395 (leveling agent from Hoechst), a mixture of 0.03 part by weight of Collacral® PU 75 (polyurethane-based thickener from BASF AG) and 0.44 part by weight of deionized water, and also with 3.0 parts by weight of deionized water. This gave the dispersion (B/D).

Subsequently, the dispersion (A/C/D) and the dispersion (B/D) were combined to give the aqueous component (I).

1.2 The Preparation of Component (II)

Component (II) was prepared by mixing 46.4 parts by weight of Bayhydur® VPLS 2150 (hydrophilic polyisocyanate based on isophorone diisocyanate from Bayer AG), 32.5 parts by weight of Bayhydur® VPLS 2219 (hydrophilic polyisocyanate based on hexamethylene diisocyanate from Bayer AG) and 21.1 parts by weight of Solvesso® 200.

1.3 The Preparation of the Novel Aqueous Multicomponent Coating Material

The novel aqueous multicomponent coating material was prepared by mixing 14.2 parts by weight of component (II) (cf. item 1.2) with 100 parts by weight of component (I) (cf. item 1.1). Component (II) was incorporated into component (I) by hand with stirring. By adding 12 parts by weight of deionized water the coating material was adjusted to the desired spray viscosity.

Comparative Experiment C 1

The Preparation of a Conventional Aqueous Multicomponent Coating Material

Example 1 was repeated but using, instead of Neocryl® XK70, the same amount of the secondary dispersion from preparation example 1.

Example 2 and Comparative Experiment C 2

The Production of an Inventive (Example 2) and of a Noninventive (Comparative Experiment C 2) Dry-Sanding Primer-Surfacer Coat For example 2, the dry-sanding primer-surfacer of example 1 was used.

For comparative experiment C 2, the dry-sanding primer-surfacer of comparative experiment C 1 was used.

The dry-sanding primer-surfacers were applied to commercially customary steel panels, phosphated and primed with a cathodic electrodeposition coating, in two spray passes with a flashoff time of five minutes in between using SATA NR95 sprayguns from SATA, Kornwestheim. Thereafter, the wet films were flashed off at room temperature for 30 minutes and cured at 60° C. for 30 minutes.

In a first series, application was made such that curing resulted in dry-sanding primer-surfacer coats with a dry film thickness of from 50 to 60 µm.

In a second series, application was made in wedge form for the purpose of determining the popping limit.

The dry-sanding primer-surfacer coating of comparative experiment C 2—first series showed popping marks at a dry-film thickness of from 50 to 60 µm. The dry-sanding primer-surfacer coat of comparative experiment C 2—second series gave a popping limit of 40 µm.

In contrast, the dry-sanding primer-surfacer coat of example 2—first series was free from popping marks and other film defects. Overall, it showed excellent leveling and outstanding adhesion to the electrodeposition coating. It was easy to sand and lent itself readily to overcoating with two-component topcoat materials as commonly used in automotive refinish. The dry-sanding primer surfacer coat of example 2—second series gave a popping limit of 110 µm.

What is claimed is:

1. An aqueous multicomponent coating material comprising:
   (I) an aqueous component comprising a mixture product of:
      (A) at least one secondary aqueous dispersion of at least one (meth)acrylate copolymer containing on average per molecule at least one isocyanate-reactive functional group,
      (B) at least one primary aqueous dispersion of at least one (meth)acrylate copolymer containing no isocyanate-reactive functional group and having a number average molecular weight Mn of between 100,000 and 3,000,000 Daltons, and
      (C) at least one pigment and a filler, wherein the weight ratio of (meth)acrylate copolymer (A) to (meth)acrylate copolymer (B) in component (I) is from 10:1 to 1:3;
   and also
   (II) a component comprising a crosslinking agent comprising at least one polyisocyanate,
   wherein the coating has a popping limit greater than 100 µm.

2. The aqueous multicomponent coating material of claim 1, wherein the (meth)acrylate copolymer (A) is prepared by a multistage copolymerization.

3. The aqueous multicomponent coating material of claim 1, wherein the (meth)acrylate copolymer (A) is prepared by a two-stage copolymerization.

4. The aqueous multicomponent coating material of claim 1, wherein the (meth)acrylate copolymer (B) is prepared by emulsion polymerization.

5. The aqueous multicomponent coating material of claim 1, wherein component (II) is liquid.

6. The aqueous multicomponent coating material of claim 1, wherein the isocyanate-reactive functional groups are selected from the group consisting of hydroxyl groups, thiol groups, primary imino groups, secondary amino groups, imino groups, and combinations thereof.

7. The aqueous multicomponent coating material of claim 1, wherein the (meth)acrylate copolymer (A) is present in component (I), based on its solids, in an amount of from 5 to 50% by weight.

8. The aqueous multicomponent coating material of claim 1, wherein the (meth)acrylate copolymer (B) is present in component (I), based on its solids, in an amount of from 5 to 50% by weight.

9. A method comprising forming a coating on a substrate from the aqueous multicomponent coating material of claim 1, wherein the coating is one of an automotive OEM finishing, an automotive refinish, building coating, a door coating, a window coating, a furniture coating, an industrial coating, a coil coating, a container coating, an electrical component impregnation, an electrical component coating, an appliance coating, a boiler coating, or a radiator coating.

10. The method of claim 9, wherein the coating is a primer-surfacer or topcoat for the automotive OEM finishing or the automotive refinish.

11. The method of claim 10, wherein the coating is a dry-sanding primer-surfacer for the automotive refinish.

* * * * *